United States Patent
Babcanec et al.

(10) Patent No.: US 10,309,089 B2
(45) Date of Patent: Jun. 4, 2019

(54) LIQUID QUALITY SYSTEM WITH DRAG INDUCING PORTIONS

(71) Applicant: ADVANCED DRAINAGE SYSTEMS, INC., Hilliard, OH (US)

(72) Inventors: Joseph Andrew Babcanec, Powell, OH (US); Ronald R. Vitarelli, Marlborough, MA (US); Daniel J. Figola, Powell, OH (US); Corey M. Francis, Columbus, OH (US); Owen Michael Atchison, Van Buren, OH (US); Bill Russell Vanhoose, Findlay, OH (US); Bo Liu, Clarksburg, MD (US); Charles Robert Bitler, Littlestown, PA (US); Terrianne Elizabeth Martin, Damascus, MD (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 15/646,794

(22) Filed: Jul. 11, 2017

(65) Prior Publication Data
US 2018/0245327 A1    Aug. 30, 2018

Related U.S. Application Data

(60) Provisional application No. 62/463,322, filed on Feb. 24, 2017.

(51) Int. Cl.
*E03F 5/04* (2006.01)
*E03F 5/14* (2006.01)
(Continued)

(52) U.S. Cl.
CPC ........ *E03F 5/0403* (2013.01); *B01D 21/0042* (2013.01); *B01D 21/2411* (2013.01);
(Continued)

(58) Field of Classification Search
CPC ...... E03F 5/0403; E03F 5/14; B01D 21/0039; B01D 21/0042; B01D 21/265; B04C 5/103
(Continued)

(56) References Cited

U.S. PATENT DOCUMENTS

| 2,378,632 A | 6/1945 | Hooker, Jr. et al. |
| 3,272,343 A | 9/1966 | Caldwell |

(Continued)

FOREIGN PATENT DOCUMENTS

CN    105089135    11/2015

OTHER PUBLICATIONS

Contech Engineered Solutions LLC , JellyFish Filter, Solutions Guide, 2016, Jellyfish Brochure MC 1.5M 6/16 (8 pages).
(Continued)

*Primary Examiner* — Christopher Upton
(74) *Attorney, Agent, or Firm* — McAndrews, Held & Malloy, Ltd.

(57) ABSTRACT

A liquid quality system for removing particulates from liquid (e.g., storm-water runoff). The system can include tubular portion (e.g., a manhole). The tubular portion has an inlet and an outlet. The system includes liquid quality device. The liquid quality device includes a partitioning portion. The partitioning portion has a first region including a funnel shape with a sump inlet aperture. The partitioning portion also has a second region including a sump outlet aperture and optionally a sump access aperture. A sump region is located between a base portion and the partitioning portion, wherein a flow of the liquid travels from the inlet in the tubular portion, into the funnel, through the sump inlet aperture, into the sump region, through the sump outlet aperture, and out the outlet of the tubular portion. At least one drag-inducing portion is positioned proximate the tubu-
(Continued)

lar portion in the sump region and projecting inwardly towards a central axis of the sump region.

11 Claims, 12 Drawing Sheets

(51) Int. Cl.
*B01D 21/26* (2006.01)
*C02F 1/38* (2006.01)
*B01D 21/00* (2006.01)
*B01D 21/24* (2006.01)
*C02F 103/00* (2006.01)

(52) U.S. Cl.
CPC .............. *B01D 21/265* (2013.01); *C02F 1/38* (2013.01); *E03F 5/14* (2013.01); *B01D 2221/12* (2013.01); *C02F 2103/001* (2013.01)

(58) Field of Classification Search
USPC ..... 210/170.03, 519, 521, 532.1, 747.2, 801
See application file for complete search history.

(56) References Cited

U.S. PATENT DOCUMENTS

| | | | |
|---|---|---|---|
| 3,847,813 A | 11/1974 | Castelli | |
| 4,643,834 A | 2/1987 | Batutis | |
| 4,722,800 A | 2/1988 | Aymong | |
| 4,897,206 A | 1/1990 | Castelli | |
| 5,004,534 A | 4/1991 | Buzzelli | |
| 5,762,810 A | 6/1998 | Pelton | |
| 5,849,181 A | 12/1998 | Monteith | |
| 6,068,765 A | 5/2000 | Monteith | |
| 6,315,131 B1* | 11/2001 | Terrien | B01D 17/0208 210/519 |
| 6,371,690 B1 | 4/2002 | Monteith | |
| 7,422,683 B2* | 9/2008 | Park | E03F 5/14 210/170.03 |
| 7,666,303 B2 | 2/2010 | Williams | |
| 7,682,509 B2 | 3/2010 | Murray | |
| 8,123,935 B2 | 2/2012 | Murray | |
| 8,221,618 B2 | 7/2012 | Murray | |
| 8,287,726 B2 | 10/2012 | Williams | |
| 8,308,959 B2* | 11/2012 | Noles, Jr. | B01D 21/0045 210/519 |
| 8,865,006 B2* | 10/2014 | Ford | B01D 21/0042 210/532.1 |
| 2007/0012608 A1* | 1/2007 | Su | E03F 5/14 210/170.03 |
| 2008/0185325 A1 | 8/2008 | Murray et al. | |
| 2010/0187191 A1* | 7/2010 | Triglavcanin | B01D 21/2405 210/519 |
| 2013/0264257 A1* | 10/2013 | Anderson | E03F 5/14 210/170.03 |
| 2014/0021148 A1 | 1/2014 | Buckner | |
| 2014/0299553 A1 | 10/2014 | Dubois | |
| 2016/0160489 A1 | 6/2016 | Garbon et al. | |
| 2017/0240438 A1* | 8/2017 | Babcanec | B04C 5/103 |

OTHER PUBLICATIONS

PCT International Searching Authority, Notification of Transmittal of the International Search Report and the Written Opinion of the International Searching Authority, or the Declaration, PCT/US2018/019382, dated May 7, 2018, 12 pages.

\* cited by examiner

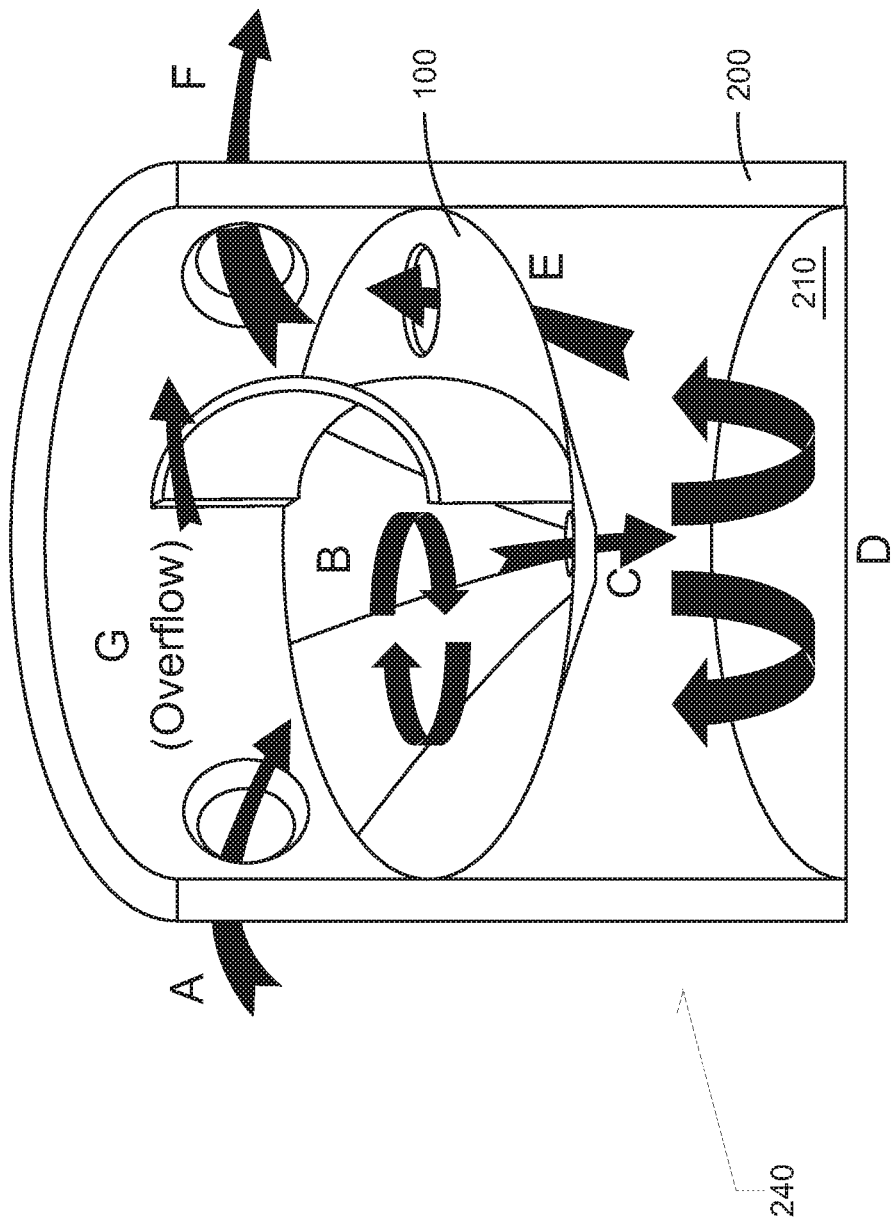

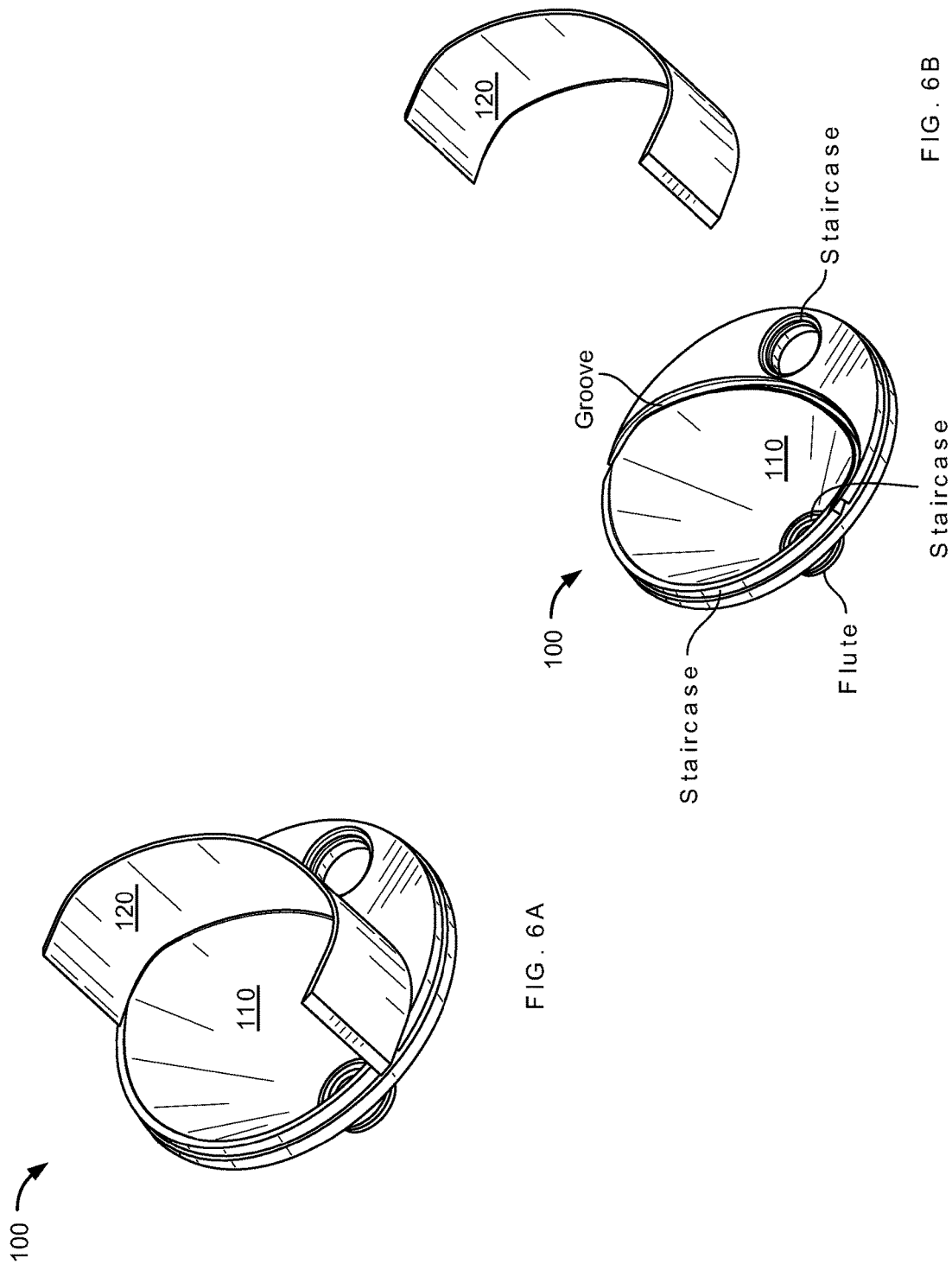

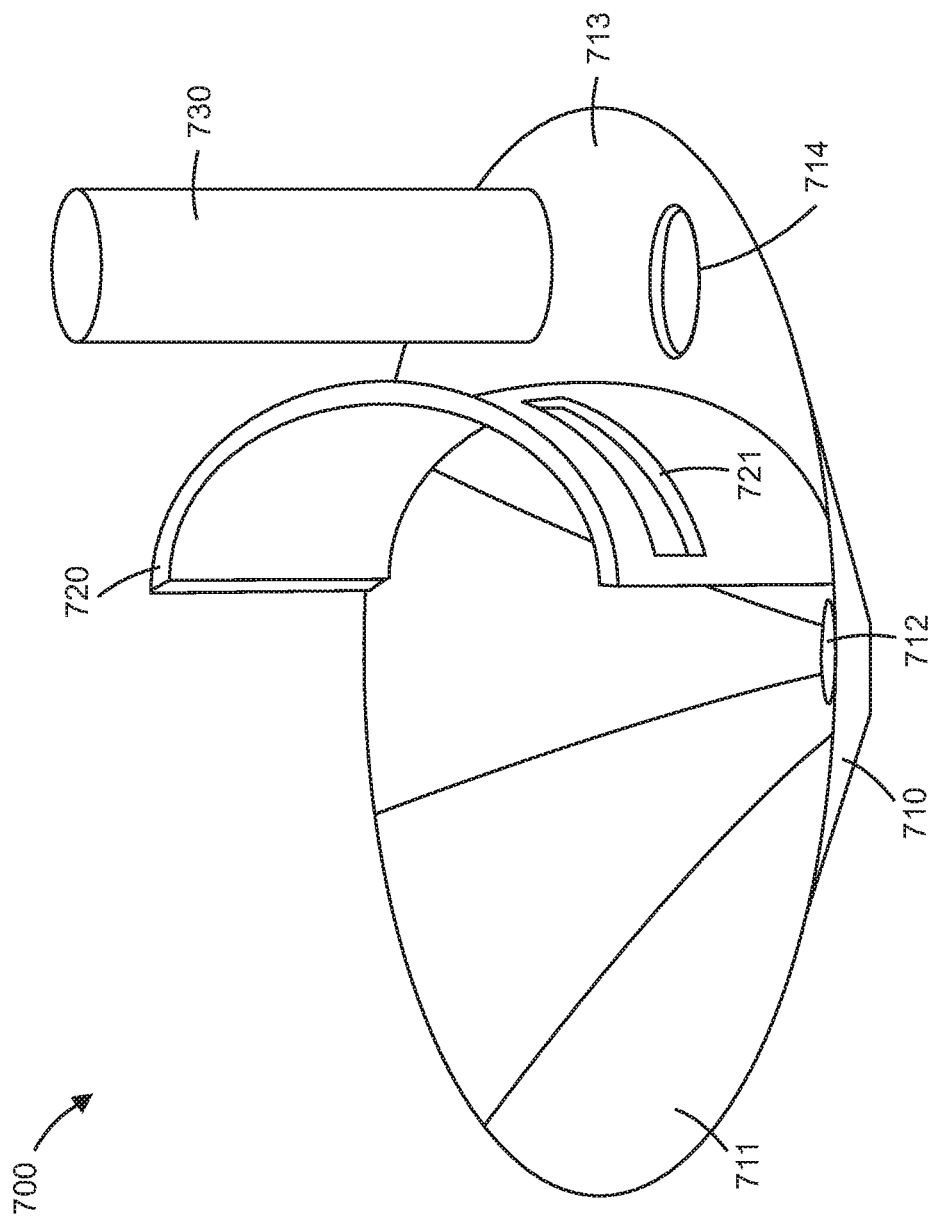

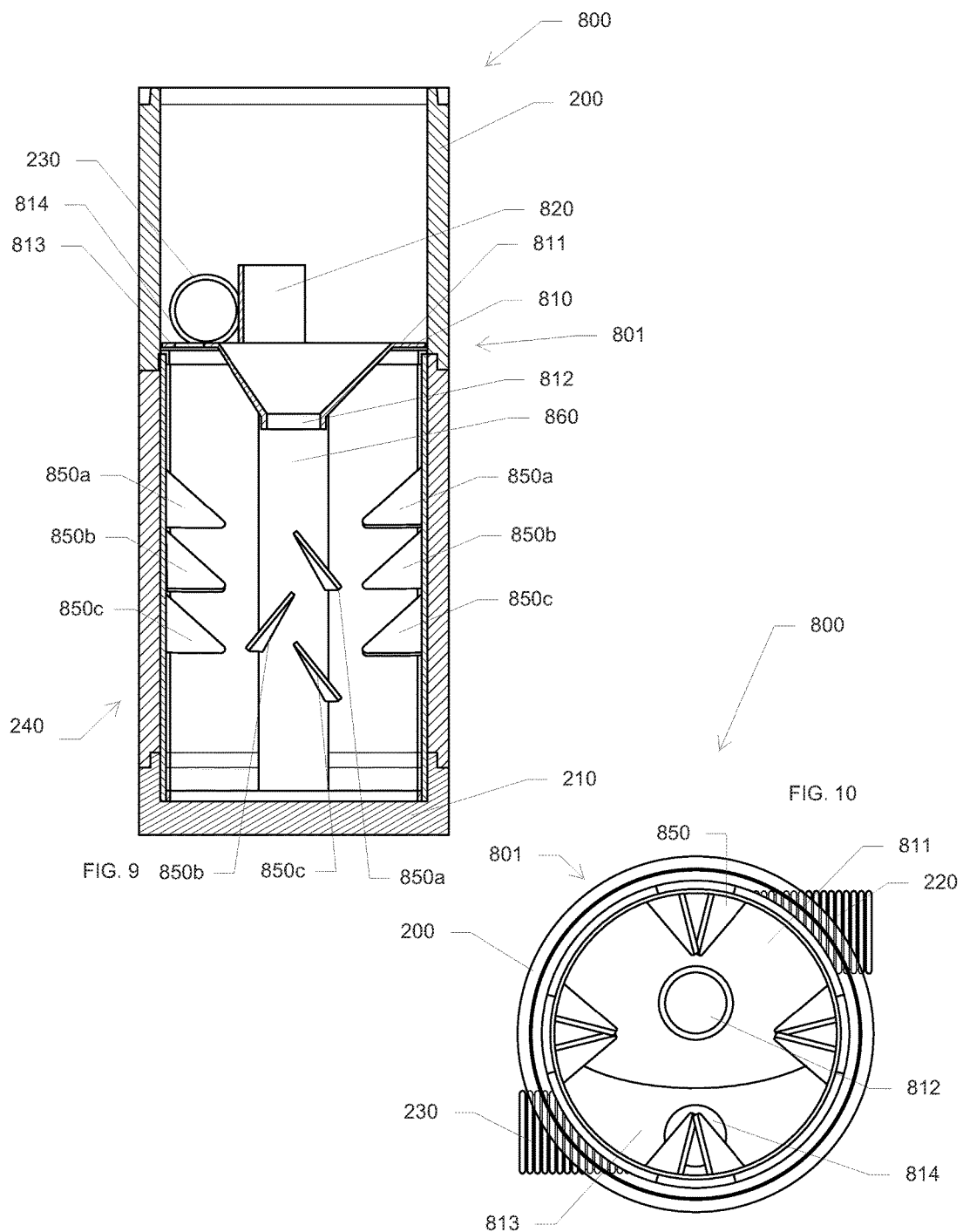

LIQUID QUALITY SYSTEM WITH DRAG INDUCING PORTIONS

CROSS REFERENCE TO RELATED APPLICATIONS

This application claims priority to U.S. Pat. Appl. Ser. No. 62/463,322 filed on Feb. 24, 2017, which is herein incorporated by reference in its entirety.

BACKGROUND

Generally, this application relates to techniques for removing sediment, debris, pollutants, and/or total suspended solids (all or some of which can be herein referred to as "particulates") from a liquid, such as storm-water runoff. In particular, this application discloses techniques for removing at least some particulates from storm-water runoff.

Water runoff management (e.g., water generated by a rainfall) may be a challenging issue for landowners or municipalities. Not only does the flow of water have to be managed in order to reduce the risk of flooding, but particulates in the water should also be reduced, because such particulates reach rivers, ponds, lakes, or the ocean. Therefore, improved techniques of reducing particulates in water runoff are desired.

SUMMARY

According to certain inventive techniques, a system for removing particulates from liquid. The system may include: a base portion; a tubular portion extending upwardly from the base portion, wherein the tubular portion may include an inlet and an outlet; and liquid quality device. The liquid quality device may include a partitioning portion. The partitioning portion may include: a first region comprising a funnel and a sump inlet aperture, wherein the first region may be arranged to receive a flow of the liquid from the inlet of the tubular portion; and a second region comprising a sump outlet aperture, wherein the second region may be arranged to transfer a flow of the liquid to the outlet of the tubular portion. The system may also include a sump region located between the base portion and the partitioning portion, wherein a flow of the liquid may travel from the inlet in the tubular portion, into the funnel, through the sump inlet aperture, into the sump region, through the sump outlet aperture, and out the outlet of the tubular portion. The system may additionally include at least one drag-inducing portion positioned proximate the tubular portion in the sump region and projecting inwardly towards a central axis of the sump region. The system may further include a weir extending upwardly from the partitioning portion and positioned between the first region and the second region.

The at least one drag-inducing portion may be attached to a supporting portion, which may be positioned proximate the tubular portion in the sump region. The system may also include a plurality of drag-inducing portions, positioned proximate the tubular portion in the sump region and projecting inwardly towards the central axis of the sump region. The plurality of drag-inducing portions may be attached to the supporting portion. The system may also include a plurality of supporting portions, each being positioned proximate the tubular portion in the sump region and having attached at least one respective plurality of drag-inducing portions.

The plurality of drag-inducing portions may include: a first drag-inducing portion; a second drag-inducing portion located below the first drag-inducing portion; and a third drag-inducing portion located below the second drag-inducing portion. Such an arrangement of drag inducing portions may respectively be attached to a plurality of supporting portions, each being positioned proximate the tubular portion in the sump region. The plurality of supporting portions may be positioned equidistantly around a perimeter of the tubular portion from the other plurality of supporting portions. The plurality of supporting portions may include: a first supporting portion; a second supporting portion; a third supporting portion; and a fourth supporting portion.

The first drag-inducing portion and second drag-inducing portion of each the first supporting portion and third supporting portion respectively may have a different orientation than the first drag-inducing portion and second drag-inducing portion of each the second supporting portion and fourth supporting portion. Additionally, the first drag-inducing portion, second drag-inducing portion, and third drag-inducing portion of each the first supporting portion and third supporting portion may be angled upwardly. Similarly, the first drag-inducing portion, second drag-inducing portion, and third drag-inducing portion of each the second supporting portion and fourth supporting portion may be angled downwardly.

The first drag-inducing portion and third drag-inducing portion of each the first supporting portion and third supporting portion may be angled 60 degrees from a horizontal plane. The second drag-inducing portion of each the first supporting portion and third supporting portion may be angled 120 degrees from a horizontal plane. The first drag-inducing portion and third drag-inducing portion of each the second supporting portion and fourth supporting portion may be angled −60 degrees from a horizontal plane. The second drag-inducing portion of each the second supporting portion and fourth supporting portion may be angled −120 degrees from a horizontal plane.

The second drag-inducing portion of each the first supporting portion and third supporting portion may be located at the same vertical position along a primary axial dimension as the first drag-inducing portion of each the second supporting portion and fourth supporting portion. Similarly, the third drag-inducing portion of each the first supporting portion and third supporting portion may be located at the same vertical position along a primary axial dimension as the second drag-inducing portion of each the second supporting portion and fourth supporting portion.

The at least one drag-inducing portion may include a substantially triangular shape. Moreover, the supporting portion may be integrated with the partitioning portion.

According to certain inventive techniques, a system for removing particulates from liquid and inducing drag in a liquid flow, wherein the system may be configured for insertion into a manhole thereby creating a sump region below the system. The system may include a partitioning portion positioned above the sump region. The partitioning portion may include: a first region, which may include a funnel and a sump inlet aperture; and a second region, which may include a sump outlet aperture. The system may also include at least one drag-inducing portion positioned proximate a sidewall of the manhole in the sump region. The at least one drag-inducing portion may project inwardly towards a central axis in the sump region. The system may also include a weir extending upwardly from the partitioning portion and positioned between the first region from the second region.

The at least one drag-inducing portion is attached to a supporting portion, which may be positioned proximate to the sidewall of the manhole in the sump region. The system may also include: a first supporting portion; a second supporting portion; a third supporting portion; and a fourth supporting portion. Each of the first supporting portion, second supporting portion, third supporting portion and fourth supporting portion may be positioned proximate to the sidewall of the manhole in the sump region and include: a first drag-inducing portion; a second drag-inducing portion located below the first drag-inducing portion; and a third drag-inducing portion located below the second drag-inducing portion.

BRIEF DESCRIPTION OF SEVERAL VIEWS OF THE DRAWINGS

FIG. 5A illustrates a sequence showing how fluid flows through a liquid quality device in a manhole, according to certain inventive techniques.

FIG. 6A illustrates a perspective view of a liquid quality device, according to certain inventive techniques.

FIG. 6B illustrates a perspective and exploded view of a liquid quality device, according to certain inventive techniques.

FIG. 7 illustrates a liquid quality device, according to certain inventive techniques.

FIG. 9 illustrates a cross-sectional view of the liquid quality system including a plurality of drag-inducing portions taken along line 9-9 in FIG. 8, according to certain inventive techniques.

FIG. 10 illustrates a bottom-plan view of the liquid quality system including a plurality of drag-inducing portions according to certain inventive techniques.

Figure 1:
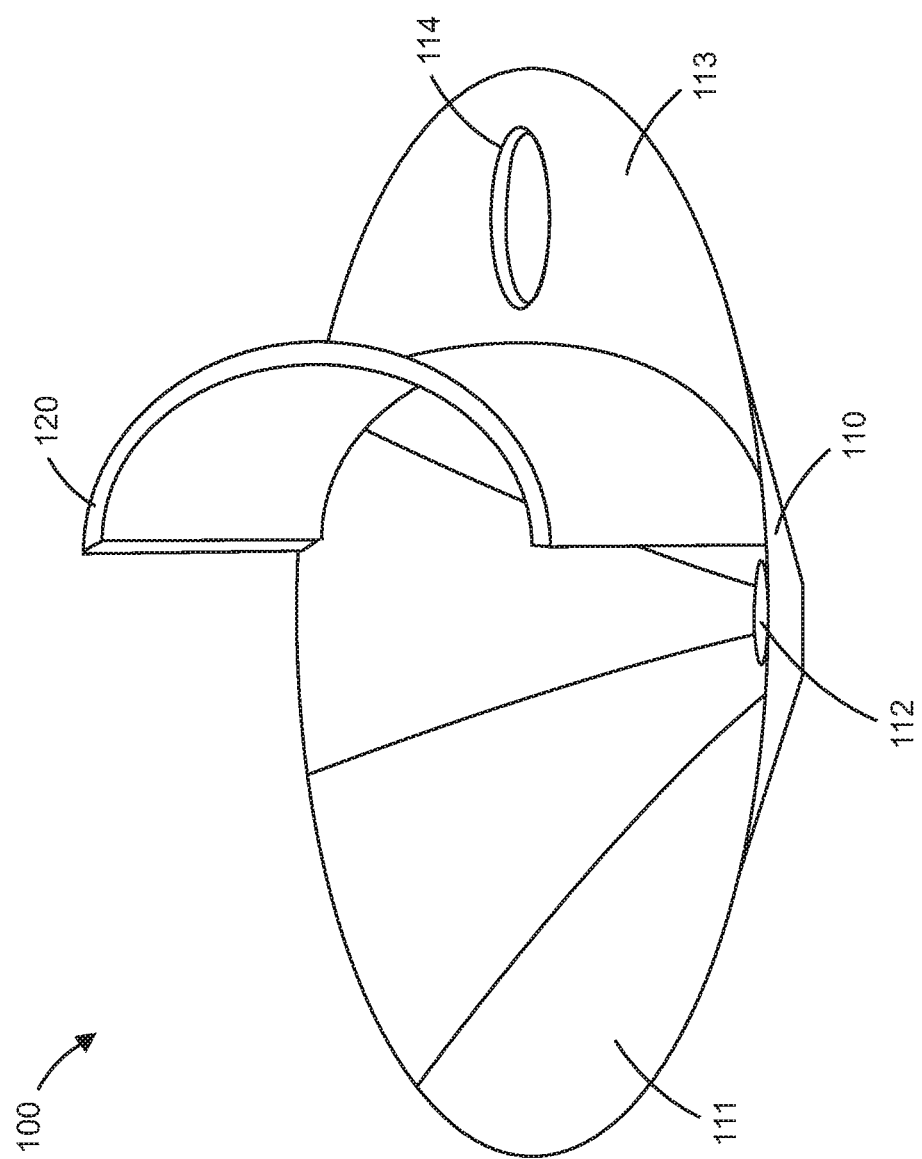
FIG. 1 illustrates a perspective view of liquid quality device, according to certain inventive techniques.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Parts Listing

| Number | Description |
| --- | --- |
| 100 | liquid quality device |
| 110 | partitioning portion |
| 111 | first region |
| 112 | sump inlet aperture |
| 113 | second region |
| 114 | sump outlet aperture |
| 120 | weir |
| 200 | manhole |
| 210 | base |
| 220 | inlet |
| 230 | outlet |
| 240 | sump region |
| 700 | liquid quality device |
| 710 | partitioning portion |
| 711 | first region |
| 712 | sump inlet aperture |
| 713 | second region |
| 714 | sump outlet aperture |
| 720 | weir |
| 721 | aperture |
| 730 | clean-out riser |
| 800 | liquid quality system |
| 801 | liquid quality device |
| 810 | partitioning portion |
| 811 | first region |
| 812 | sump inlet aperture |
| 813 | second region |
| 814 | sump outlet aperture |
| 820 | weir |
| 850 | drag-inducing portion |
| 860 | supporting portion |
| 850a | first drag-inducing portion |
| 850b | second drag-inducing portion |
| 850c | third drag-inducing portion |
| 860a | first supporting portion |
| 860b | second supporting portion |
| 860c | third supporting portion |
| 860d | fourth supporting portion |

A liquid quality system may be used to reduce particulates in liquid runoff (e.g., storm-water runoff). Some liquid quality system may induce a vortex in the liquid, causing suspended particulates to settle on the outside of the vortex, thereby separating the liquid from the particulates. However, if the velocity of the vortex is too great, the liquid flow may be very turbulent. Moreover, if the velocity of liquid flow is too great in the vortex, the settled particulates may be mixed back up into the liquid (resuspension). The combination of turbulence and resuspension may thus reduce the effectiveness of the liquid quality device.

According to the techniques disclosed herein, an inventive liquid quality system may be better adapted to remove particulates by reducing the speed of the vortex and creating a long laminar liquid flow path. By forcing smooth direction changes in the flow path and directing the liquid flow away from the outlet, the overall length of the flow path may increase. Additionally, by subjecting the vortex to drag, the velocities within the vortex may decrease. These techniques may improve the effectiveness of the liquid quality device, and will be described in greater detail below.

FIG. 1 illustrates a perspective view of a liquid quality device 100, according to certain inventive techniques. The liquid quality device 100 includes a partitioning portion 110 and a weir 120. The partitioning portion 110 may have a first region 111 and a second region 113, which may be separated by the weir 120. The partitioning portion 110 may be one integrated piece, or formed from separate pieces (e.g., the first region 111, the second region 113, the funnel (e.g., vortex-inducing region), etc.) The partitioning portion 110 and/or the weir 120 may include a material such as polyethylene or polypropylene. The partitioning portion 110 and weir 120 may be one integrated piece or may be separate pieces.

The weir 120 may completely (or partially) separate the first region 111 from the second region 113. As can be seen, the weir 120 may have a curvature along a horizontal dimension, and this curvature may be concave when viewed from the first region 111. The curvature may be constant, or may have a curve with a varying radius as shown. For example, the depicted curvature has shorter radiuses at the edges and one or more longer radiuses in the center. Such a varying-radius design may facilitate the creation of a relatively smooth transition between the weir 120 and the sidewall of a tubular portion (e.g., a manhole) in which the liquid quality device 100 is inserted (the "tubular portion" is discussed below). Tubular means to have a cross-sectional profile that can be round, oval, square, hexagonal, octagonal, or other some other shape. Such a varying curvature may assist in reducing turbulence (which may negatively impact the efficiency of the liquid quality device 100 to remove particulates). Alternatively, there may be no curvature, or there may be convex curvature in the weir 120, as viewed from the first region 111.

The first region 111 may include a funnel (vortex-inducing region) and a sump inlet aperture 112 as depicted in FIG. 1. The funnel may be designed to increase the length of time that the flow remains in the funnel and thus in a vortex. That in conjunction with the decreasing radius helps to maximize particulate separation. The second region 113 may include a sump outlet aperture 114. The second region 113 may have a generally flat profile in the horizontal dimension.

The size of the apertures 112 and/or 114 may be determined by using the following equation:

$$Q = C_d A \sqrt{2gh}$$

Where Q=flow rate in cubic feet per second;
$C_d$=is the coefficient of discharge;
A=area of the aperture in square feet;
g=is the acceleration of gravity (32.2 ft./second$^2$); and
h=the head in feet acting on the aperture.

Figure 2:
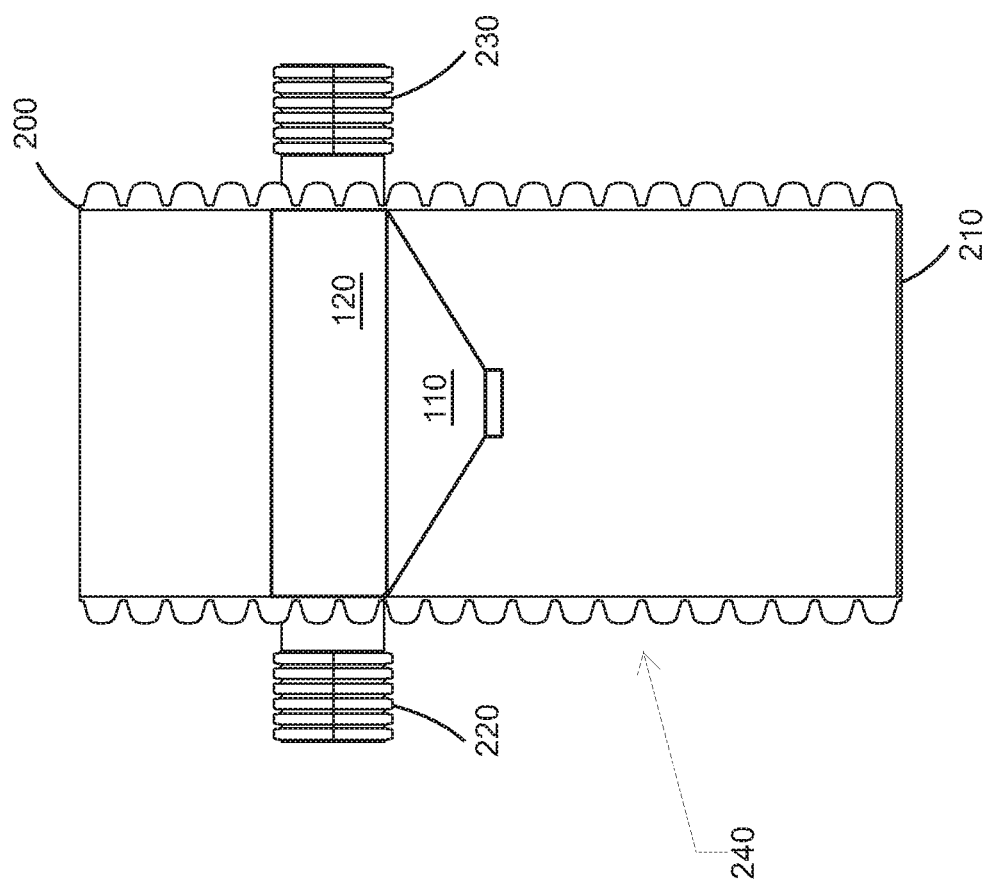
FIG. 2 illustrates an elevational view, partially cross-sectioned, of a liquid quality device in a manhole, according to certain inventive techniques.

FIG. 2 illustrates an elevational view, partially cross-sectioned, of the liquid quality device 100 in a manhole 200, according to certain inventive techniques. The manhole 200 may include a base 210, an inlet 220, and an outlet 230. Any one of the base 210, the inlet 220, and/or the outlet 230 may be integrated into the body of the manhole 200, or they may be separate pieces that work or connect together to achieve the functions described herein.

The area between the liquid quality device 100 and the base 210 may be a sump region 240. As will be described in further detail with respect to FIG. 5, liquid may flow into the manhole 200 through the inlet 220 and then into the sump region 240, thereby passing through the liquid quality device 100. The liquid may exit the sump region 240 through the liquid quality device 100 and then exit the manhole 200 through the outlet 230.

Figure 3:
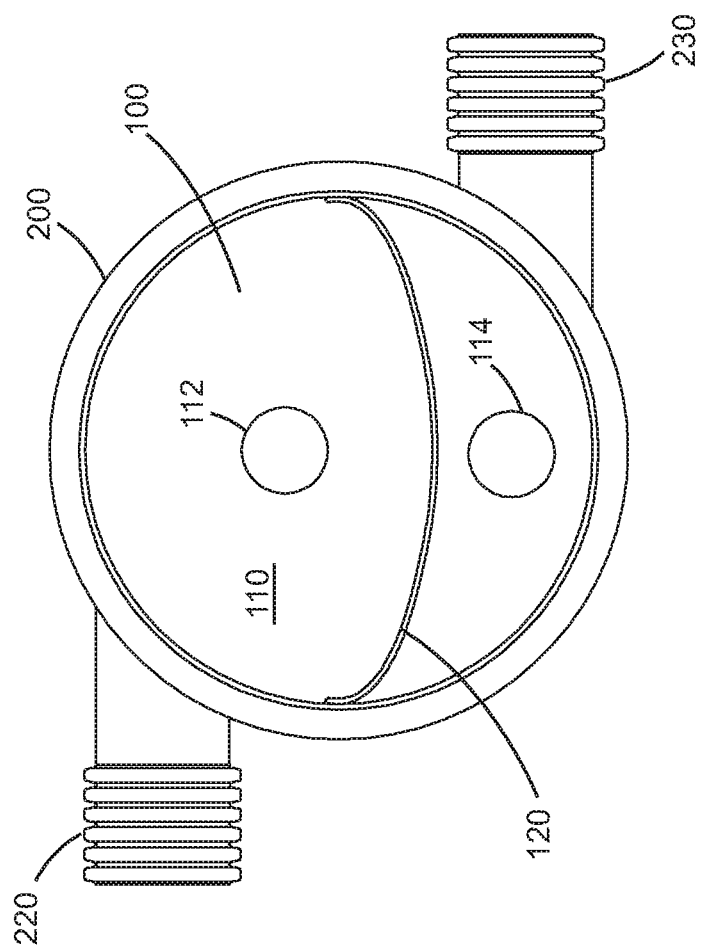
FIG. 3 illustrates a top view of a liquid quality device in a manhole with an inline arrangement, according to certain inventive techniques.
Figure 4:
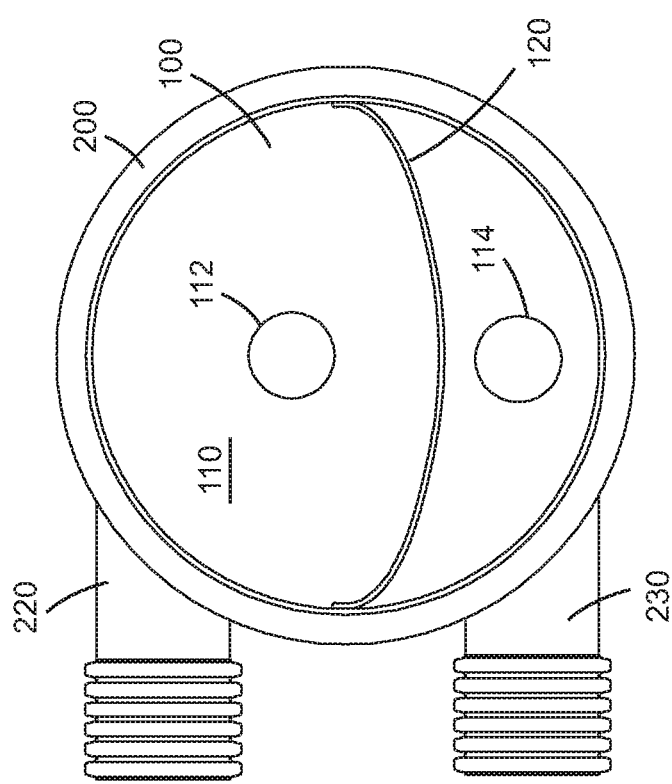
FIG. 4 illustrates a top view of a liquid quality device in a manhole with an offline arrangement, according to certain inventive techniques.

FIG. 3 illustrates a top view of the liquid quality device 100 in the manhole 200 with an inline arrangement of the inlet 220 and outlet 230, according to certain inventive techniques. In this arrangement, liquid enters the manhole 200 on one side through the inlet 220 and exits on the other side through the outlet 230. FIG. 4 illustrates an offline arrangement, where liquid enters and exits on the same side of the manhole 200. Other arrangements are possible, such as liquid entering and exiting the manhole 200 at right angles or oblique angles.

FIG. 5A illustrates a sequence showing how liquid flows through the liquid quality device 100 in the manhole 200, according to certain inventive techniques. At step A, liquid (which has suspended particulates) may enter the manhole 200 through the inlet 220. The liquid enters the manhole 200 at a location above the liquid quality device 100, and more particularly above the first region 111. During lower liquid volume flow (e.g., the first flush), the liquid is inhibited from flowing into the second region 113 by the weir 120.

At step B, the funnel of the liquid quality device 100 together with the weir 120 induces the liquid into a vortex. At step C, the liquid passes through the liquid quality device 100 via sump inlet aperture 112 and into the sump region 240 (e.g., the area in the manhole 200 between the liquid quality device 100 and the base 210). At step D, the liquid propagates into the sump region 240 in the general direction shown by the arrows. Once the liquid passes into the sump region 240, the vortex action may be reduced through detention time and energy losses. This may allow smaller pollutants that were not removed through the cyclonic action of the vortex in the funnel to settle out of the liquid.

At step E, the liquid exits the sump region 240 through the sump outlet aperture 113. The liquid is now above the second region 113, and the weir 120 inhibits the liquid from flowing back into the first region 111. At step F, the liquid exits the manhole 200 through outlet 230.

As the liquid level above the first region 111 rises, it will begin to, at step G, overtop the weir 120 and flow into an area above the second region 113. This liquid then exits the manhole 200 through the outlet 230, thereby bypassing the vortex-inducing steps. The overflowing liquid does not pass through the sump region 240, and therefore treatment is bypassed. By allowing a portion of the increased liquid flow to avoid the treatment area in the sump region 240, liquid flow velocities in the sump region 240 will be reduced. Consequently, there will be less of a problem with settled particulates being mixed back up with the liquid.

After the event, the settled particulates can be cleaned out through either the sump inlet aperture 112, the sump outlet aperture 114, or an additional aperture (not shown) in the liquid quality device 100. For example, a tube can be inserted through one or more of these apertures, and a vacuum can be applied through the tube.

Figure 5B:
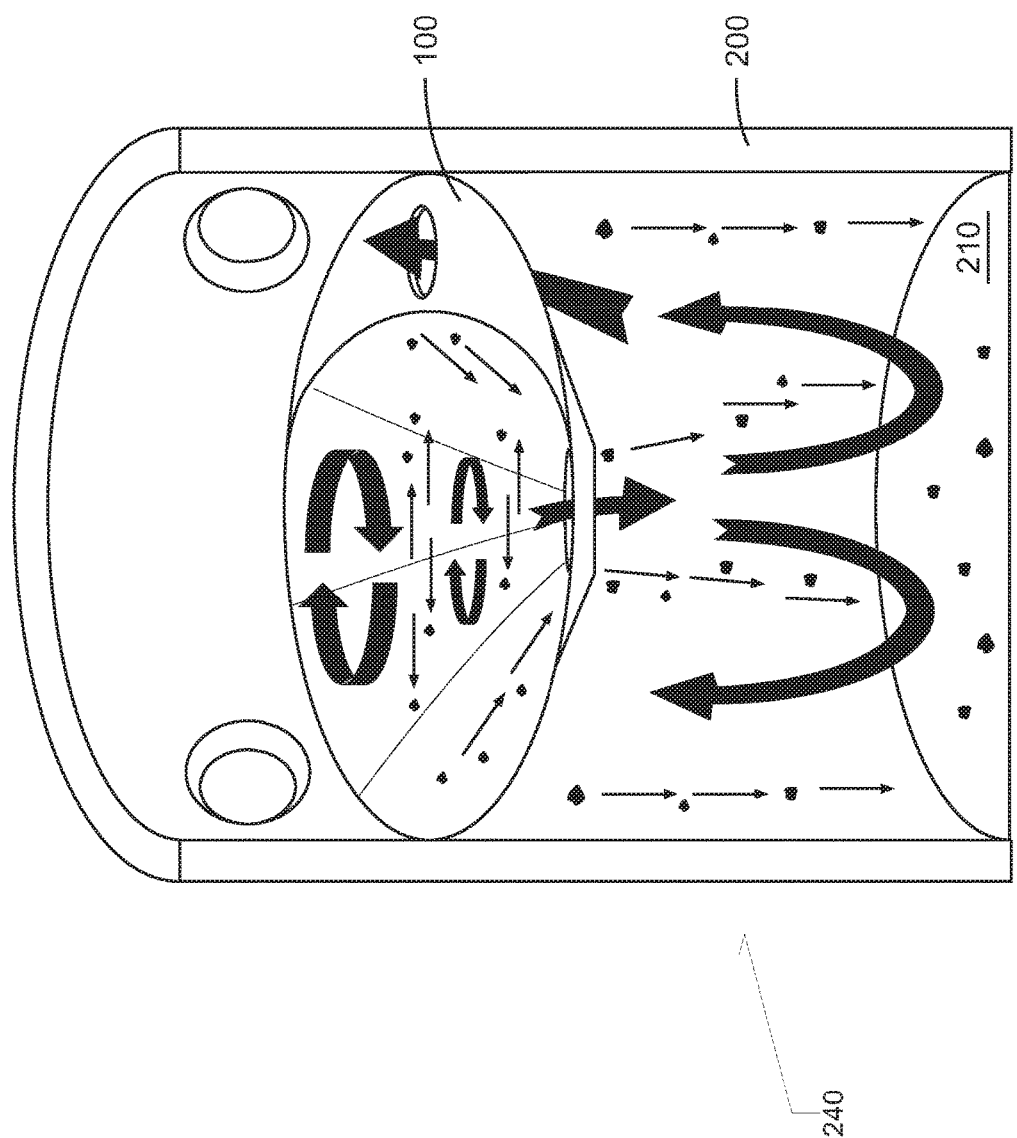
FIG. 5B illustrates a sequence showing how particulates are separated from a liquid by use of a liquid quality device in a manhole, according to certain inventive techniques.

FIG. 5B illustrates a sequence showing how particulates are separated from a liquid by use of the liquid quality device 100 (depicted without the weir 120 for clarity in the illustration) in the manhole 200, according to certain inventive techniques. As depicted, a vortex formed in the funnel region of the liquid quality device 100 pushes some of the relatively heavier particulates to the edges of the vortex (near the sides of the funnel) via a centrifugal force. These particles will then drop through the sump inlet aperture 112 into the sump region 240, landing on the base 210.

Relatively lighter particulates will enter the sump region 240 and be carried upwards by the liquid flow. As these particulates are carried upward in the sump region 240, the liquid flow loses velocity. This allows these relatively lighter particulates to fall out of the liquid flow and onto the bottom of the sump region 240.

Figure 6C:
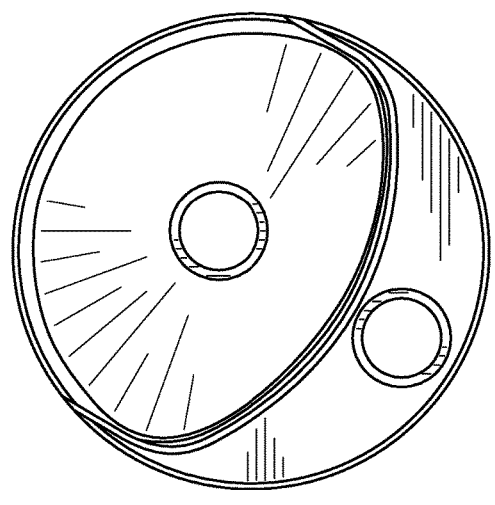
FIG. 6C illustrates a top view of a liquid quality device, according to certain inventive techniques.
Figure 6D:
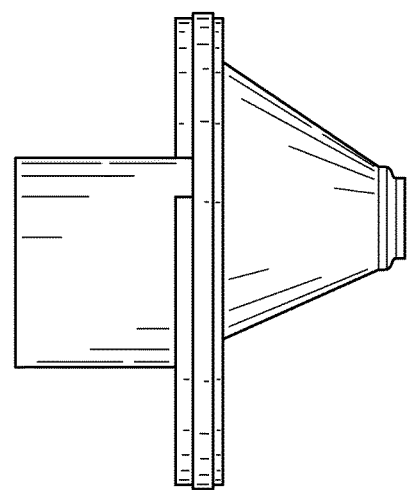
FIG. 6D illustrates an elevational view of a liquid quality device, according to certain inventive techniques.

FIGS. 6A-6D illustrate additional detail of optional details and/or features for the liquid quality device 100, according to certain inventive techniques. FIG. 6A illustrates a perspective view of the liquid quality device 100. FIG. 6B depicts an exploded view of the device 100. FIG. 6C shows a top view of the device. FIG. 6D illustrates an elevational view of the device 100.

With reference particularly to FIG. 6B, it can be seen that the partitioning portion 110 may have a groove sized and shaped to receive the weir 120. The grove may allow for proper and consistent placement of the weir 120 and may facilitate the weir 120 to be attached to the partitioning portion 110 through welding or fastening. The outer rim of the partitioning portion 110 may have a staircase profile with two or more levels, whereby the lower level(s) have larger radiuses than the higher level(s). This design may allow for convenient modifications for treatment flow rates by providing guides for different aperture sizes. Each of the sump inlet aperture 112 and/or sump outlet aperture 114 may also have a staircase profile with two or more levels, whereby a lower level of a given aperture may be narrower than an upper level. This allows for simple modifications for treatment flow rates by providing guides for different aperture sizes. The sump inlet aperture 112 also may have a flute (see FIG. 6D for a fuller profile of the flute) that extends downwardly from the funnel of the partitioning portion 110.

Exemplary dimensions of the liquid quality device 100 are as follows. The partitioning portion 110 may have an outer diameter of approximately 47". The weir 120 may have a height of approximately 16". The widest diameter of the funnel along the longest horizontal axis may be approximately 34.39". The height of the funnel may be approximately 23.25". The groove may be approximately 2" deep.

The smallest level of the staircase profile in the sump inlet aperture 112 may be approximately 8" in diameter. The widest aperture of the sump inlet aperture 112 may be approximately 10" in diameter. Similarly, the smallest level of the staircase profile in the sump outlet aperture 114 may be approximately 8" in diameter, while the widest may be approximately 10" in diameter. It may be possible to choose which size apertures 112, 114 are to be used on site or in a factory or facility. For example, narrow apertures (e.g., 8" apertures) may be used for relatively lower flow applications (e.g., 0.6 cubic feet per second). Optionally, the narrower levels (e.g., 8" apertures) the may be removed, thereby leaving a wider levels (e.g., 10" apertures). The wider apertures may be used for relatively higher flow applications (e.g., 1.0 cubic feet per second). The narrower level(s) may be removed with a knife or saw, thereby leaving the wider level(s).

The liquid quality device 100 may not have different levels. It may be manufactured to have different dimensions (e.g., different aperture 112, 114 sizes) in accordance with the principles discussed above.

FIG. 7 illustrates a liquid quality device 700 with an alternative design and/or optional features, according to certain inventive techniques. Similar to the one described above, the liquid quality device includes a partitioning portion 710 and a weir 720. The partitioning portion 710 may have a first region 711 and a second region 713, which may be separated by the weir 720. The weir 720 may completely (or partially) separate the first region 711 from the second region 713. The first region 711 may include a funnel and a sump inlet aperture 712 as depicted in FIG. 7. The second region 713 may include a sump outlet aperture 714. The second region 713 may have a generally flat profile in the horizontal dimension.

The liquid quality device 700 may also include a clean-out riser 730 that extends upwardly from an additional aperture (not visible in the figure because it is underneath the riser 730, but may be termed a sump access aperture) in the second region 713. A vacuum may be applied to the clean-out riser 730 to remove settled particulates from the sump region 240.

The weir 720 may also have an aperture 721 (e.g., having a rectangular shape). The aperture size and location may be selected to allow an increased flow rate that falls between the design treatment rate and ultimate flow rate (approximately 3× the treatment flow rate) to pass through the aperture 721 without overtopping the entire weir 720. The design treatment rate may be the flow rate of liquid that is intended to pass through the unit and receive treatment for the removal of particulates. The ultimate flow rate may be the total flow rate of the liquid that can pass through the unit (rate that receives treatment and rate that overtops the weir combined) without overflowing from the tubular structure. By not overtopping the weir 720, this may assist in containment of large debris and force it into the sump region 240.

As the flow rates in the liquid quality device 700 approach the ultimate flow rate (again, approximately 3× the treatment flow rate) the additional liquid volume will overtop the weir 720 and exit the device 700. As this point the influent is typically considered to have substantially reduced levels of particulates, and therefore in no need for treatment. By allowing the flows to overtop the weir 720, this also helps reduce velocities in the sump region 240 which in turn helps to reduce the re-suspension of the previously collected particulates.

FIGS. 8-42 illustrate a liquid quality system 800 with an alternative design and/or optional features, according to certain inventive techniques. The liquid quality system 800 may include a liquid quality device 801, similar to the ones described above. The liquid quality device 801 may generally comprise, as described above, a partitioning portion 810 and a weir 820. The partitioning portion 810 may have a first region 811 and a second region 813, which may be separated by the weir 820. The liquid quality system may include manhole 200, which may include a base 210, an inlet 220, and an outlet 230. Any one of the base 210, the inlet 220, and/or the outlet 230 may be integrated into the body of the manhole 200, or they may be separate pieces that work or connect together to achieve the functions described herein. The liquid quality device 801 may be positioned in a manhole 200.

The liquid quality system 800 may have a vertical central vertical axis (not shown), that runs the primary (longer) length of the system, including through the sump region 240, where a primary axial dimension runs parallel to, or along the central axis. The liquid quality system 800 may also include at least one drag-inducing portion(s) 850 and at least one supporting portion(s) 860.

As discussed above, inducing a vortex in the liquid within a liquid quality system 800, may assist in removing particulates from the liquid. However, if the liquid flow velocity and/or turbulence in the vortex in the sump region 240 are too great, the settled particulates may be mixed back up into the liquid, thus reducing the effectiveness of the liquid quality system. The introduction of drag-inducing portion(s) 850 may assist in reducing the liquid flow velocity and/or turbulence in vortex in the sump region 240.

The drag-inducing portion(s) 850 may require a certain flow-rate to begin affecting the flow of the liquid in the sump region 240. At lower flow rates the funnel may create a vortex in first region 811, causing liquid to flow through the sump inlet orifice 812 and shoot straight down into the sump region 240. As the flow rate increases, so does the rotational energy of the liquid. Thus, at higher flow rates, the vortex induced by the funnel in the first region 811 may have enough rotational energy to create a vortex in the sump region 240 after the water passes through the sump inlet orifice 812. Such a vortex in the sump region 240 may have strong turbulence. The liquid flow velocity and/or the turbulence of the vortex in the sump region 240 may increase as the flow rate increases.

By controlling the liquid flow velocities and/or vortex in the sump region 240, the filtering of particulates may be positively affected. As a result of a relatively high flow rate, the turbulent vortex may pick up already settled particulates from the floor of the sump region 240. Thus, one aspect of the present disclosure is to reduce such resuspension, also called "scour effect," of settled particulates in the sump region 240 by transforming the turbulent flow of the vortex into a controlled and increasingly laminar flow.

Aside from a relatively high liquid flow velocity, liquid turbulence within the vortex may affect the behavior of the liquid flow and may also influence the settling characteristics of particulates in the flow. Generally, the greater the liquid turbulence and liquid flow velocity in the sump region 240, the more difficult it may be for particulates to settle, and the easier it may be for resuspension of particles to occur. Therefore, it may be desirable to create a longer, more laminar flow path to increase the amount of time which liquid remains in the sump region 240, thereby providing sufficient time for particulates to settle at the base 210 of the sump region 240. Thus, a second aspect of the present disclosure is to ensure optimal settling of particulates by creating a longer, more laminar flow path in the sump region 240. One way to create a longer, more laminar flow path may be to force the liquid to make smooth direction changes as it moves around the sump region 240 in the vortex. Another technique may guide the liquid away from the sump outlet aperture 814 to increase the amount of time that liquid remains in the sump region 240.

For example, once a vortex is formed in the sump region 240, one way to force smooth direction changes and guide the liquid flow away from the sump outlet aperture 814 is to position at least one drag-inducing portion(s) 850, which projects inwardly towards the central axis, proximate a sidewall of manhole 200 in the sump region 240. Proximate a sidewall means proximate to or on the side wall of the tubular portion of the manhole 200 in the sump region 240. Projecting inwardly towards the central axis means projecting, at least partially, towards the central axis. The drag-inducing portion(s) 850 may have several effects on liquid that passes over it including: creating drag to slow the liquid flow velocities in the vortex; extending the flow path by forcing a smooth direction change; and/or guiding liquid away from the sump outlet aperture 814. The orientation and angle of the drag-inducing portion(s) 850, as will be discussed in more detail below, may be chosen to achieve an enhanced settling efficiency. The impact of the drag-inducing portion(s) 850 may increase as the flow rate increases.

The drag-inducing portion(s) 850 may have a solid or hollow body, and may displace some volume of the liquid in the sump region 240. Thus, when liquid flow passes by the body of the drag-inducing portion(s) 850, the liquid in the flow is "split" and displaced by body of the drag inducing portion(s) 850. As a result, a boundary layer may form along the surface(s) of the drag-inducing portion(s) 850. The boundary layer may result in the liquid changing in viscosity and becoming more dense (i.e., viscous diffusion). Liquid with such a change in viscosity and density may be convected downstream until the flow separates. Such a splitting of the flow path may additionally aid in the settling of particulates. The combination of splitting the flow and forcing direction changes may result in particulates being knocked or falling out of the vortex flow.

To effectively reduce the liquid flow velocity in the vortex and alter the flow path of liquid in the sump region 240, a plurality of drag-inducing portions 850, which project inwardly toward the central axis, may be positioned proximate the sidewall of manhole 200 in the sump region 240. The drag-inducing portions 850 may be attached to at least one supporting portion(s) 860, which may in turn be attached to the sidewall of the sump region 240. The word attached may mean directly or indirectly attached, such as directly attached to the sidewall of the sump region 240, or attached to the supporting portion 860, which are in turn attached to the sidewall of the sump region 240. Attached also may mean attached by an adhesive or by means of a screw or bolt configuration (not shown). Lastly, attached may mean attached as a single formed and integrated piece. Alternatively, the plurality of drag-inducing portions 850 may be directly attached the sidewall of the sump region 240.

The drag-inducing portion(s) 850 may comprise a substantially triangular shape. Substantially triangular may mean that the corners may be rounded, or that other small variations may exist. In one embodiment, the drag-inducing portion(s) 850 may comprise an isosceles right triangle shape. Other shapes are also possible—for example: rectangles; squares; ovals; circles; other triangles; or various other polygons. The exposed tip of each drag-inducing portion 850 pointing at least partially towards the central axis of the sump region 240 may be rounded.

Figure 8:
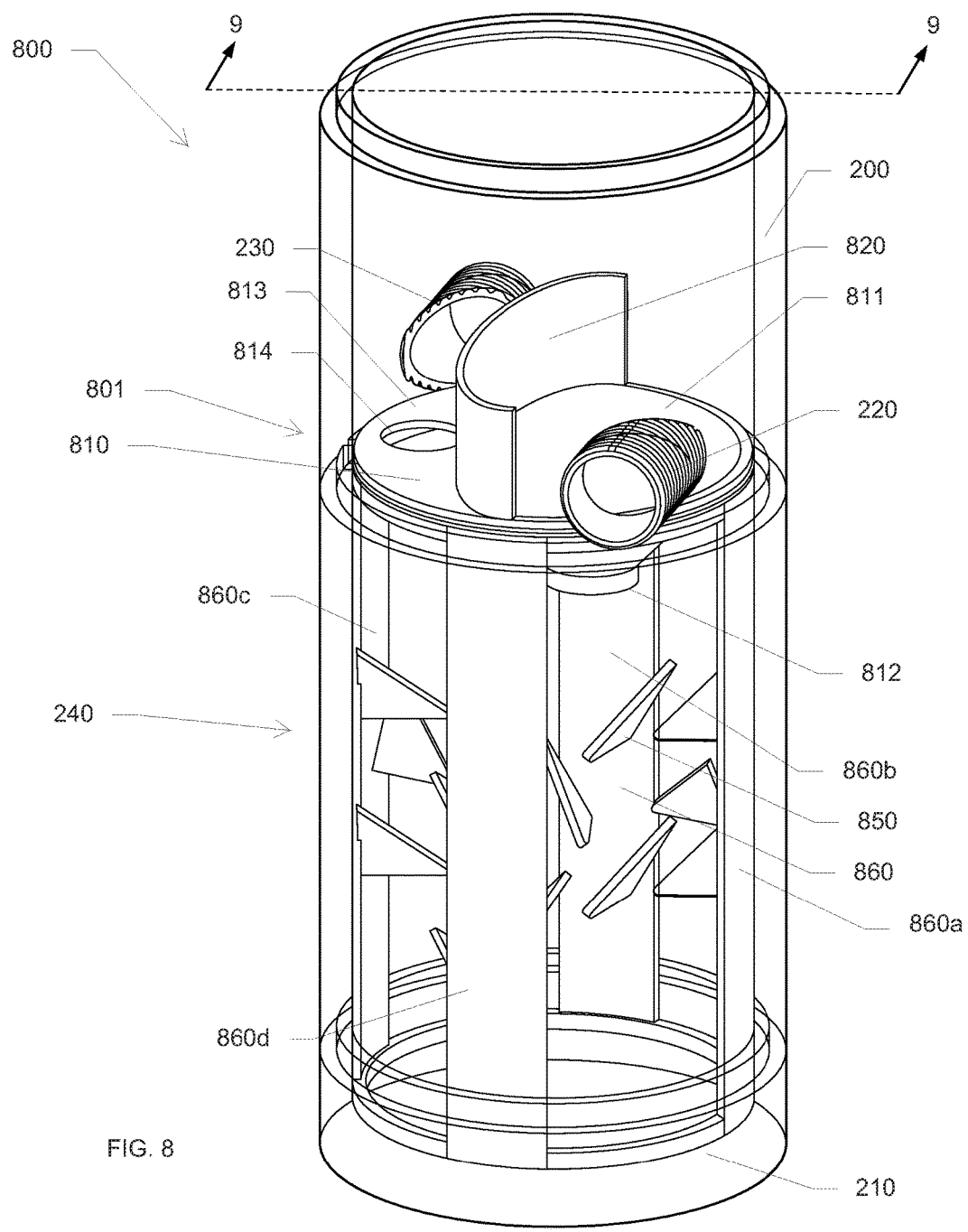
FIG. 8 illustrates liquid quality system including a plurality of drag-inducing portions attached to a supporting portion, according to certain inventive techniques.

As shown in FIGS. 8, 10, the supporting portion(s) 860 may comprise vertical strips (e.g., generally rectangular in shape) that may be positioned between the partitioning portion 810 and the base 210 proximate the sidewall of manhole 200 in the sump region 240. Moreover the plurality of supporting portion(s) 860 may be spaced equidistant around a perimeter of the sump region 240. A perimeter means proximate or on the sidewall of manhole 200 in the sump region 240. Alternatively, the plurality of supporting portion(s) 860 may be irregularly spaced around the perimeter of the sump region 240. The supporting portion(s) 860 may also comprise a different shape. For example, the drag-inducing portion(s) 850 may be attached to a circumferential supporting portion(s) 860 (e.g., a toroid) (not shown). Alternatively, the supporting portion(s) 860 could be triangular, square, oval, parallelogram, etc. and may be positioned equidistant or irregularly around the perimeter of the sump region 240. Moreover, the supporting portion(s) 860 may be attached to the sidewall of the sump region 240. Additionally, the supporting portion(s) 860 may be integrated into the body of the manhole 200, and/or partitioning portion 810, and/or base 210, or they may be separate pieces that work or connect together to achieve the functions described herein. A plurality of supporting portions 860 may be beneficial for efficient manufacture and installation.

One embodiment, as shown in FIGS. 8-10, may include a first drag-inducing portion 850*a*, a second drag-inducing portion 850*b*, and a third drag-inducing portion 850*c* (collectively drag-inducing portions), each of which may project inwardly toward the central axis and may be positioned proximate the sidewall of manhole 200 in the sump region 240. Four sets of the drag-inducing portions 850*a*, 850*b*, 850*c* may be respectively attached to a first supporting portion 860*a*, a second supporting portion 860*b*, a third supporting portion 860*c*, and a fourth supporting portion 860d (collectively, supporting portions), each of which may be may be positioned and/or attached proximate the sidewall of manhole 200 in the sump region 240. The supporting portions 860a, 860b, 860c, and 860d may be positioned equidistant around the perimeter of the sump region 240. The vertical positioning of drag-inducing portions 850a, 850b, 850c may be generally central on each of the supporting portions 860a, 860b, 860c, and 860d. Other configurations are also possible. For example, more drag-inducing portions 850 and/or supporting portions 860 may be useful for larger diameter and/or taller sump regions 240. By contrast, fewer drag-inducing portions 850 and/or supporting portions 860 may be useful for smaller diameter and/or shorter sump regions 240. Additionally, the group of drag-inducing portions 850a, 850b, 850c may be positioned more towards the top or bottom on each of the supporting portions 860a, 860b, 860c, and 860d.

In one embodiment supporting portions 860a and 860c, may have a different configuration of drag-inducing portions 850a, 850b, 850c, than supporting portions 860b and 860d. In such an embodiment, the supporting portions 860a and 860c may face each other and have a first configuration and orientation of drag-inducing portions 850a, 850b, 850c. By contrast, the supporting portions 860b and 860d may still face each other, but they may comprise a second, different configuration and/or orientation of drag-inducing portions 850a, 850b, 850c.

Figure 11:
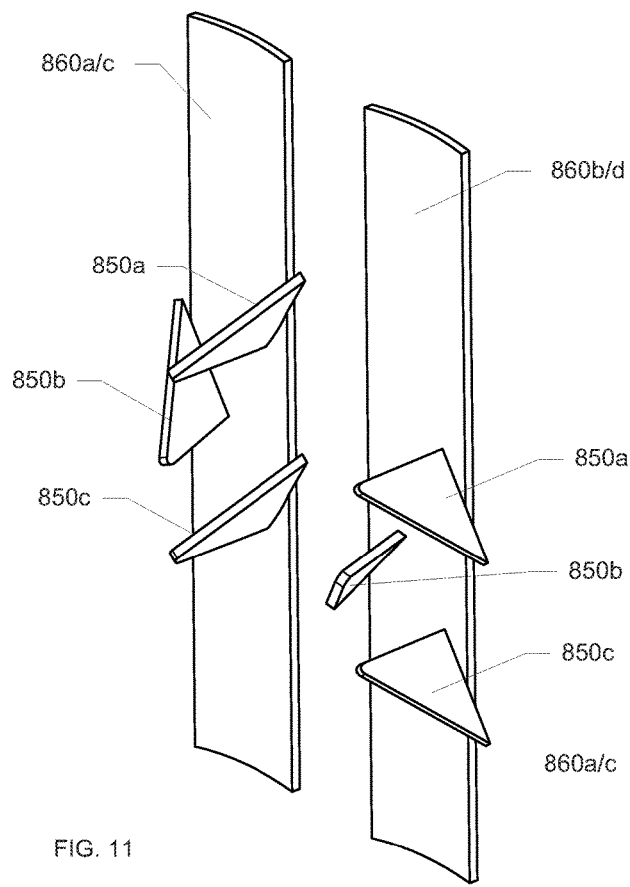
FIG. 11 illustrates a perspective view of a plurality of drag-inducing portions according to certain inventive techniques.
Figure 12:
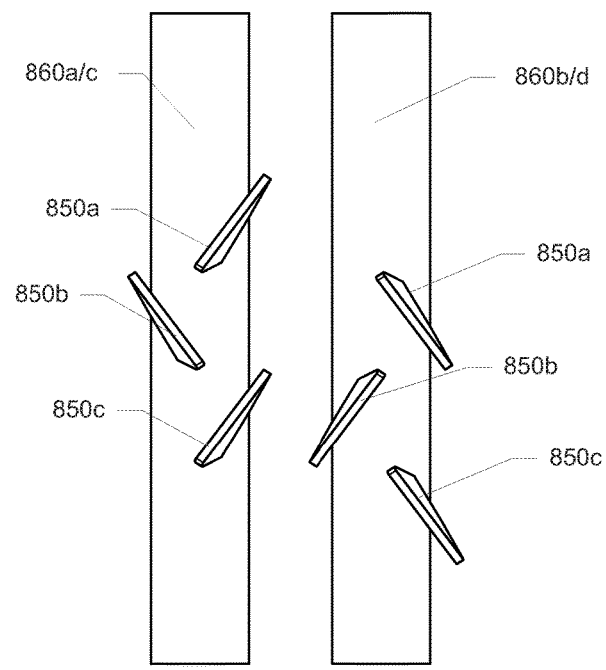
FIG. 12 illustrates a front elevational view of a plurality of drag-inducing portions according to certain inventive techniques.

As shown in FIGS. 11, 12, in the first configuration, drag-inducing portions 850a, 850b, 850c may be equidistantly vertically positioned along a primary axial dimension. The drag-inducing portions 850a, 850b, 850c may also be irregularly vertically positioned along a primary axial dimension. The drag-inducing portions 850a, 850b, 850c may each be oriented generally upwardly (e.g., having a positive slope). The first drag-inducing portion 850(a) and the third drag-inducing portion 850(c) may be oriented in the same direction. For example, the first drag-inducing portion 850(a) and the third drag-inducing portion 850(c) may each be angled 60 degrees from a horizontal plane. The second drag-inducing portion 850(b) may have a mirrored orientation from the first drag-inducing portion 850(a) and the third drag-inducing portion 850(c). The second drag-inducing portion 850(b) may be angled 120 degrees from a horizontal plane. Smaller or larger positive angles are also possible for the orientation of the drag-inducing portions 850a, 850b, 850c in the first configuration.

In the second configuration, drag-inducing portions 850a, 850b, 850c may each be equidistantly vertically positioned along a primary axial dimension. The drag-inducing portions 850a, 850b, 850c may also be irregularly vertically positioned along a primary axial dimension. The drag-inducing portions 850a, 850b, 850c may each be oriented generally downwardly (e.g., having a negative slope as compared to those drag-inducing portions in the first configuration). The first drag-inducing portion 850(a) and the third drag-inducing portion 850(c) may be oriented in the same direction. For example, the first drag-inducing portion 850(a) and the third drag-inducing portion 850(c) may each be angled −60 degrees from a horizontal plane. The second drag-inducing portion 850(b) may have a mirrored orientation from the first drag-inducing portion 850(a) and the third drag-inducing portion 850(c). The second drag-inducing portion 850(b) may be angled −120 degrees from a horizontal plane. Smaller or larger negative angles are also possible for the orientation of the drag-inducing portions 850a, 850b, 850c in the second configuration.

The drag-inducing portions 850a, 850b, 850c in the first configuration may be respectively vertically offset from the drag-inducing portions 850a, 850b, 850c in the second configuration along a primary axial dimension as shown in FIG. 12. In one embodiment the second drag-inducing portion 850b of each the first supporting portion 860a and third supporting portion 860c may be located at the same or substantially the same vertical position along a primary axial dimension as the first drag-inducing portion 850a of each the second supporting portion 860b and fourth supporting portion 860d. Likewise, the third drag-inducing portion 850c of each the first supporting portion 860a and third supporting portion 860c may be located at the same or substantially the same vertical position along a primary axial dimension as the second drag-inducing portion 850b of each the second supporting portion 860b and fourth supporting portion 860d.

Such an offset positioning of drag-inducing portions 850a, 850b, 850c between supporting portions 860a, 860b, 860c, and 860d may assisting in extending the length of the liquid flow path. For example, if the flow path is forced upward by the third drag-inducing portion 850c of the second supporting portion 860b or fourth supporting portion 860d, it may subsequently be forced downward by the third drag-inducing portion 850c of the first supporting portion 860a or fourth supporting portion 860c once the flow reaches there.

The angular position of the drag-inducing portions 850a, 850b, 850c may be based off the principles of Stoke's Law and "inclined plate settling" techniques. For example, in the embodiment in which the drag-inducing portions are positioned at a positive or negative 60 degree angle, the positioning of the drag-inducing portions 850 may help facilitate particulate settling. As previously discussed, particulate settling may be facilitated by increasing the length of the flow path, reducing the vortex velocities, and reducing the settling distance by directing relatively smooth, laminar flow towards the bottom of the sump region. An angular positioning of 60 degrees may also allow particulates to slide down the drag-inducing portion(s) 850 and fall to the bottom of the sump region. A higher degree angle may decrease the settling efficiency, while an angle less than 45 degrees may lead to particulate accumulation on the drag-inducing portions.

The size and orientation of the drag-inducing portions 850 may be chosen in assistance with the following equations:

$$t = \frac{w}{v\cos\theta}$$

$$L = \frac{w(V - v\sin\theta)}{v\cos\theta}$$

Where: w is the settling distance from the inlet orifice to the bottom of the sump region;
v is the settling velocity, in/s;
θ is the angle of the manhole from horizontal; and
L is the length of the drag-inducing portions $$\frac{du_p}{dt} = F_D(u - u_p) + \frac{g_x(\rho_p - \rho)x^2}{\rho_p} + F_x$$

$$F_D = \frac{18u}{\rho_p d_p^2} \frac{C_D R_p}{24}$$

-continued $$R_p = \frac{\rho d_p |u_p - u|}{u}$$

$$C_d = \frac{24}{R_p}$$

Where: $u_p$ is the particle velocity;
u is the fluid velocity;
ρ is the fluid density;
$ρ_p$ is the particle density;
$g_x$ is the gravity,
x and $F_x$ are additional forces such as body forces and forces due to pressure gradients; and
$F_D$ is the drag force being composed of the liquid molecular viscosity μ, the particle diameter $d_p$, the Reynolds number of the particle $R_p$ and the drag coefficient $C_d$.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A system for removing particulates from liquid, wherein the system comprises:
    a base portion;
    a tubular portion extending upwardly from the base portion, wherein the tubular portion comprises an inlet and an outlet;
    a liquid quality device located above the base portion, wherein the liquid quality device includes a partitioning portion comprising:
        a first region comprising a funnel and a sump inlet aperture, wherein the first region is arranged to receive a flow of the liquid from the inlet of the tubular portion; and
        a second region comprising a sump outlet aperture, wherein the second region is arranged to transfer a flow of the liquid to the outlet of the tubular portion;
    a sump region located between the base portion and the partitioning portion, wherein a flow of the liquid travels from the inlet in the tubular portion, into the funnel, through the sump inlet aperture, into the sump region, through the sump outlet aperture, and out the outlet of the tubular portion; and
    a plurality of drag-inducing portions positioned proximate the tubular portion in the sump region and projecting inwardly towards a central axis of the sump region; wherein the plurality of drag-inducing portions comprise:
        a first drag-inducing portion;
        a second drag-inducing portion located below the first drag-inducing portion; and
        a third drag-inducing portion located below the second drag-inducing portion.

2. The system of claim 1, further comprising a weir extending upwardly from the partitioning portion and positioned between the first region and the second region.

3. The system of claim 1, wherein the plurality of drag-inducing portions are attached to a supporting portion, which is positioned proximate the tubular portion in the sump region.

4. The system of claim 3, further comprising a plurality of supporting portions, each being positioned proximate the tubular portion in the sump region and having attached the respective plurality of drag-inducing portions.

5. The system of claim 4, wherein each of the plurality of supporting portions are positioned equidistantly around a perimeter of the tubular portion from the other plurality of supporting portions.

6. The system of claim 5, wherein the plurality of supporting portions comprise:
    a first supporting portion;
    a second supporting portion;
    a third supporting portion; and
    a fourth supporting portion.

7. The system of claim 6, wherein the first drag-inducing portion and second drag-inducing portion of each the first supporting portion and third supporting portion respectively have a different orientation than the first drag-inducing portion and second drag-inducing portion of each the second supporting portion and fourth supporting portion.

8. The system of claim 3, wherein the supporting portion is integrated with the partitioning portion.

9. The system of claim 1, wherein the plurality of drag-inducing portion each comprises a substantially triangular shape.

10. A system for removing particulates from liquid and inducing drag in a liquid flow, wherein the system is configured for insertion into a manhole thereby creating a sump region below the system, wherein the system comprises:
    a partitioning portion positioned above the sump region, wherein the partitioning portion includes:
        a first region comprising a funnel and a sump inlet aperture; and
        a second region comprising a sump outlet aperture; and
    a plurality of drag-inducing portions positioned proximate a sidewall of the manhole in the sump region and projecting inwardly towards a central axis of the sump region; wherein the plurality of drag-inducing portions comprise:
        a first drag-inducing portion;
        a second drag-inducing portion located below the first drag-inducing portion; and
        a third drag-inducing portion located below the second drag-inducing portion;
    a first supporting portion;
    a second supporting portion;
    a third supporting portion; and
    a fourth supporting portion; wherein each the first supporting portion, second supporting portion, third supporting portion and fourth supporting portion are positioned proximate to the sidewall of the manhole in the sump region and comprise:
        the first drag-inducing portion;
        the second drag-inducing portion; and
        the third drag-inducing portion.

11. The system of claim 10, further comprising:
    a weir extending upwardly from the partitioning portion and positioned between the first region from the second region.

* * * * *